Nov. 9, 1926.
G. J. BUCQUET
1,606,693
FILTER
Filed Sept. 8, 1924
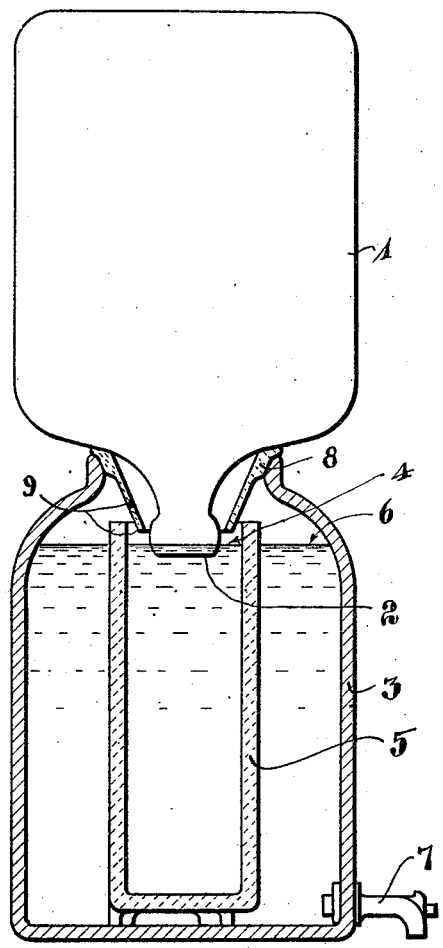
INVENTOR:
GEORGES J. BUCQUET,
By: Otto H. Krueger,
his Atty.

Patented Nov. 9, 1926.

1,606,693

UNITED STATES PATENT OFFICE.

GEORGES J. BUCQUET, OF SAN BERNARDINO, CALIFORNIA.

FILTER.

Application filed September 8, 1924. Serial No. 736,585.

This invention relates to fiilters and more particularly to so-called percolators in combination with water coolers.

One of the objects of this invention is to provide a device whereby a bottle with common unfiltered water may be disposed on top of a jar so that the water from the bottle will discharge into the lower jar as the level of the water in the lower jar comes below the opening of the upper bottle, having a filter disposed in the jar at a point between the opening of the bottle and the jar.

Another object is to provide a filtering vessel within a cooling jar in combination with a bottle disposed over the jar to discharge into the filtering vessel, by reason of the fact that the end of the bottle reaches downwardly to a point below the top edge of the inserted vessel in the jar so that the water level in the jar will be below the top edge of the inserted vessel.

Another object is to provide a packing ring within the top end of such a jar to extend downwardly to a point in relation to such an inserted vessel so as to guide a bottle into the inserted vessel when placed over such a jar.

Other objects will appear from the following description and appended claims as well as from the accompanying drawing, in which—

The figure is a vertical mid-sectional view of a filtering vessel embodying my invention disposed in a cooling jar and having a bottle illustrated disposed over the cooling jar with its discharging end extending into the filtering vessel.

The main object of this invention is to provide a device by which any common unfiltered water in a bottle may be disposed on top of a cooler in conjunction with a device according to my invention so that filtered water may be drawn from the cooler while the level of the water in the cooler is maintained by having the opening of the bottle dipped into the water in the jar. The bottle 1 illustrated in the drawing is so disposed with its open end 2 into and on top of the jar 3. The water level in the jar is thereby easily maintained at a point indicated at 4. A filtering body in form of an open-top vessel is disposed in the jar 3 as indicated at 5.

The water discharging from the bottle 1 must therefore, under this arrangement, first discharge into the filtering vessel 5 and the level of the water in the filtering body 5 is in reality controlled by the position of the end 2 of the bottle 1 in relation to the water in the vessel 5, as indicated at 4. The water level 6 surrounding the inserted vessel 5 can naturally never be above the water level at 4, but may be below the water level 4 if water is drawn rapidly from the faucet 7 of the jar 3. The water can normally only pass from the inside of the vessel 5 into the jar 3 proper to the extent as the vessel 5 allows a percolating or filtering of the water through the walls of the vessel 5.

Such a filtering vessel, of course, may be of special filtering material or special filtering rock-formation not particularly described in this application as long as made of a form to allow an arrangement as disclosed in this application.

To avoid a passing of unfiltered water from the bottle 1 to the jar 3 proper, outside of the filtering body 5 within the jar 3, a guiding member 8 is preferably inserted between the body 1 and the jar 3 on the one hand, and also between the bottle 1 and the inserted filtering vessel 5 on the other hand. The guiding member 8 is in form of a packing ring to seat the bottle 1 on top of the jar 3 with an extension extending centrally and downwardly as indicated at 9 so that the discharging end 2 of the bottle 1 may safely be dropped or disposed into the filtering vessel 5 on exchanging or refilling the bottle 1.

No dirt or sediment or other unclean matter can get into the filter or jar proper. The jar 3 is therefore always clean, and the water contained directly in the jar is as well clean.

Any sediment or any uncleanliness suspended in the unfiltered water in the bottle 1 can only pass into the filter body or vessel 5.

The filter body or vessel 5 is easily cleaned by being removed from and lifted out of the jar 3 through the top opening of the jar. When so removed from the jar, this vessel 5 is easily freed of any sediment or uncleanliness accumulated within the hollow of the vessel 5. After having been cleaned the vessel 5 is merely placed back into the jar and may then again be used for filtering water from the bottle 1 before it reaches the jar 3.

Having thus described my invention, I claim:

1. In combination with a water jar and an inverted water bottle on top of the jar, a filtering vessel within the jar closed except for the open top extending with its top edge above the opening of the inverted bottle in the jar and being made of porous material so that the water level in the vessel controls the water level in said jar at a point near the mouth of the inverted bottle.

2. In combination with a water jar and an inverted bottle disposed over the top of the jar, a filtering vessel closed except for the open top disposed within the jar of a size to be exchangable through the opening of the jar and extending in length from the bottom of the jar to a point above the opening of the inverted bottle within the jar and being made of porous filtering material.

3. In a filter, an open-top water-jar having discharging means at a point spaced distinctly from the top, a second open-top jar disposed inside of the first-named jar made of porous filtering material of a size to fit through the top opening of the first-named jar, and a water vessel in inverted position placed on top of the first-named jar so that water from such vessel will pass into the second-named jar up to a level below the top edge of the second-named jar near the mouth of the inverted vessel.

In testimony that I claim the foregoing as my invention I have signed my name.

GEORGES J. BUCQUET.